(12) United States Patent
Patterson

(10) Patent No.: US 10,546,104 B2
(45) Date of Patent: Jan. 28, 2020

(54) SYSTEM FOR THE MONITORING OF COPYRIGHTED MATERIAL

(71) Applicant: ERESERVE PTY LTD, Lismore NSW (AU)

(72) Inventor: Karey Patterson, Lismore NSW (AU)

(73) Assignee: ERESERVE PTY LTD, Lismore NSW (AU)

( * ) Notice: Subject to any disclaimer, the term of this patent is extended or adjusted under 35 U.S.C. 154(b) by 14 days.

(21) Appl. No.: 15/524,081

(22) PCT Filed: Nov. 3, 2015

(86) PCT No.: PCT/AU2015/000656
§ 371 (c)(1),
(2) Date: May 3, 2017

(87) PCT Pub. No.: WO2016/070219
PCT Pub. Date: May 12, 2016

(65) Prior Publication Data
US 2017/0337353 A1 Nov. 23, 2017

(30) Foreign Application Priority Data
Nov. 3, 2014 (AU) .............................. 2014904406

(51) Int. Cl.
*G06F 21/10* (2013.01)
*G06F 17/40* (2006.01)
(Continued)

(52) U.S. Cl.
CPC .............. *G06F 21/10* (2013.01); *G06F 17/40* (2013.01); *G06Q 10/10* (2013.01); *G06Q 50/184* (2013.01);
(Continued)

(58) Field of Classification Search
None
See application file for complete search history.

(56) References Cited

U.S. PATENT DOCUMENTS 7,934,266 B2 * 4/2011 Yamauchi ............... G06F 21/10
705/51
2003/0225863 A1 * 12/2003 Kajino .................... G06F 21/10
709/219

(Continued)

FOREIGN PATENT DOCUMENTS

EP       1 445 715 A1    8/2004
WO    95/34857 A1    12/1995

(Continued)

OTHER PUBLICATIONS

Supplementary European Search Report (SESR) dated Mar. 28, 2018 for Application No. EP 15 85 7061.

(Continued)

*Primary Examiner* — Christopher A Revak
(74) *Attorney, Agent, or Firm* — Ladas & Parry LLP

(57) ABSTRACT

Systems and methods monitor copyrighted material and the proportion of a document accessed. A library of material in which copyright or related rights subsist is linked to copyright data for each item of material. A database contains rules for use of copyrighted material. The extent of a document in its entirety, including copyrighted material, can be quantified e.g. by an input counter counting its text, graphics and other content. The extent of a document accessed in each instance of use of the document can be quantified e.g. by an output counter. Use of copyrighted material can be metered based on the accessed extent. Document access can be permitted e.g. based on copyright use rules. A determination can be made as to whether the proportion of a document accessed is above a predetermined (Continued)

document delivery value. If fair use is unavailable or exhausted, a user may purchase a license to access copyrighted material.

18 Claims, 7 Drawing Sheets

(51) Int. Cl.
    *G11B 20/00*     (2006.01)
    *G06Q 10/10*     (2012.01)
    *G06Q 50/18*     (2012.01)

(52) U.S. Cl.
    CPC .................. *G11B 20/00731* (2013.01); *G06F 2221/0775* (2013.01)

(56) References Cited

U.S. PATENT DOCUMENTS

| | | | |
|---|---|---|---|
| 2005/0114267 A1* | 5/2005 | Miwa | G06F 21/10 705/59 |
| 2006/0212395 A1* | 9/2006 | Winklevoss, Jr. | G06Q 30/02 705/50 |
| 2007/0005644 A1* | 1/2007 | Shih | G06F 21/10 |
| 2007/0078773 A1* | 4/2007 | Czerniak | G06F 21/10 705/57 |
| 2007/0269044 A1* | 11/2007 | Bruestle | G06F 21/10 380/54 |
| 2008/0059536 A1 | 3/2008 | Brock et al. | |
| 2008/0109911 A1 | 5/2008 | Tedesco et al. | |
| 2009/0007221 A1* | 1/2009 | Kim | G06F 21/10 726/1 |
| 2009/0260067 A1* | 10/2009 | Racabi | G06Q 20/12 726/7 |
| 2011/0010216 A1* | 1/2011 | Bhogal | G06F 21/105 705/7.31 |
| 2011/0099172 A1 | 4/2011 | Gaskill | |
| 2012/0184366 A1* | 7/2012 | Paquet | G06F 21/10 463/29 |
| 2013/0297403 A1* | 11/2013 | Manning | G06Q 30/02 705/14.39 |
| 2014/0189346 A1* | 7/2014 | Cureton | H04L 63/0846 713/155 |
| 2016/0012210 A1* | 1/2016 | Takemoto | G06F 21/105 726/28 |

FOREIGN PATENT DOCUMENTS

| | | |
|---|---|---|
| WO | 2008/144530 A2 | 11/2008 |
| WO | 2013/039478 A1 | 3/2013 |

OTHER PUBLICATIONS

International Search Report (ISR) dated Jan. 29, 2016 for Application No. PCT/AU2015/000656.

* cited by examiner

SYSTEM FOR THE MONITORING OF COPYRIGHTED MATERIAL

RELATED APPLICATION

This application is an application under 35 U.S.C. 371 of International Application No. PCT/AU2015/000656 filed on Nov. 3, 2015, the entire contents of which are incorporated herein by reference.

TECHNICAL FIELD

The present invention relates to quantifying the extent of works and quantifying the extent of portions of works whether those works be in paper form or electronic form or otherwise.

BACKGROUND

The issue of copyright control and monitoring has become increasingly important with the advent of the internet. Institutions such as schools and businesses often depend on access to the information that is contained in copyrighted works, but also want to avoid any situations where copyright abuse could be claimed.

A law commonly known as the fair-use principle, is used in most of the world's legal systems. It allows the general public to use and quote copyrighted material in limited situations and under certain circumstances. A problem exists in that many users do not understand the bounds and restrictions of these terms of use and many institutions and companies risk exposure to copyright law when individuals within the organisation use copyrighted material.

Attempts have been made in the past to try and automate this process, however they have been unsuccessful. Typically a user must purchase a work before being able to read it.

However fair-use principles dictate that a person can expect reasonable access to a work free of charge for the purpose of evaluation before committing to a purchase. This often leads to a situation where copies of copyrighted works are shared for evaluation but either intentionally or inadvertently that copy is never paid for even after fair-use bounds are exceeded. A system that helps users to ensure that their use and copying of copyrighted materials, are properly documented, authorised and paid for is highly desirable, but as yet are not available.

The described invention is designed to address these issues.

NOTES

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in one broad form of the invention there is provided a system for monitoring copyrighted material, said system comprising a library of material in which Copyright or related rights subsist;

a lookup table linking Copyright data to each item of material;
a database of Copyright use rules for use of copyrighted material;
a mechanism for quantifying the copyrighted material in each item of material;
a mechanism for metering use of the copyright material in each item of material based on quantity of material accessed in each instance of use of the item of material;
a mechanism for permitting access to the item of material as a function of the Copyright use rules.

In a further broad form of the invention there is provided an engine for monitoring proportion of a document to which access is given; the engine including:
and input counter which provides a count value which quantifies the extent of the document in its entirety;
a database for storing count value for each document referenced against each document;
an output counter which provides a count value which quantifies the extent of the document released to a user.

In yet a further broad form of the invention there is provided a method for monitoring copyrighted material, said method comprising the following steps:
providing a library of material in which Copyright or related rights subsist;
providing a lookup table linking Copyright data to each item of material;
providing a database of Copyright use rules for use of copyrighted material;
providing a mechanism for quantifying the copyrighted material in each item of material;
provide a mechanism for metering use of the copyright material in each item of material based on quantity of material accessed in each instance of use of the item of material;
providing a mechanism for permitting access to the item of material as a function of the Copyright use rules.

In yet a further broad form of the invention there is provided a system for monitoring copyrighted material, said system comprising:
a processor in communication with a memory; the memory storing a library of material in which Copyright or related rights subsist;
a lookup table residing in the memory and linking Copyright data to each item of material;
the memory further containing a database of Copyright use rules for use of copyrighted material;
a counter mechanism which measures text, graphics and content for quantifying the copyrighted material in each item of material;
a second counter mechanism which measures text, graphics and content for metering use of the copyright material in each item of material based on quantity of material accessed in each instance of use of the item of material;
a mechanism for permitting access to the item of material.

Preferably the mechanism for permitting access to the item of material allows access as a function of the Copyright use rules.

In yet a further broad form of the invention there is provided an engine for monitoring proportion of a document to which access is given; the engine including:
a processor and memory programmed with a program so as to act as an input counter which provides a count value which quantifies the extent of text, graphics and content in the document in its entirety;
a database for storing count value for each document referenced against each document;

an output counter which provides a count value which quantifies the extent of the document released to a user.

Preferably the input counter is in the form of a document scanner.

Preferably the output counter is in the form of a document scanner.

Preferably the input counter is in the form of a document ID recognition system.

Preferably the output counter is in the form of a document ID recognition system.

Preferably the input counter is in the form of a document ID recognition system which recognizes and reads document ID at a granular level.

Preferably the output counter is in the form of a document ID recognition system which recognizes and reads document ID at a granular level.

Preferably granular level is a page of a work.

The engine of any one of claims 6 to 12 wherein granular level is a page of a work identified by a DOI.

Preferably a work is identified by its allocated ISBN number identifier.

In yet a further broad form of the invention there is provided a method for monitoring copyrighted material, said method comprising the following steps:

assessing the entirety of content of a work so as to define an entire work quantity assessing and quantifying that portion of a work which is accessed so as to define an accessed quantity;

comparing the accessed quantity and the entire work quantity algorithmically with reference to a rules database so as to define a proportion component; determining if the proportion component is above a predetermined value.

In a preferred form if the proportion component is above a predetermined value then a reporting process is instigated.

In a preferred form the reporting process involves communication of data in packet form over the Internet.

In a preferred form in the event fair use is unavailable or exhausted for the item of material a user may purchase a license for use of the copyrighted material thereby permitting access to the item of material.

DRAWINGS

FIG. 1—Main components of the example embodiment.

FIG. 2—Example usage chart of the example embodiment.

FIG. 3—Example process control of the example embodiment.

DESCRIPTION AND OPERATION

Figure 1:
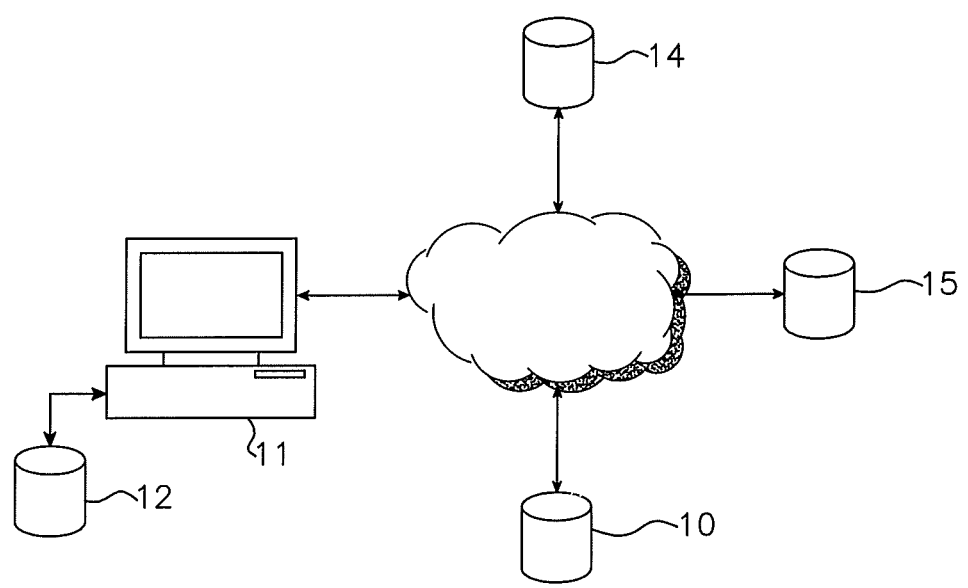

FIG. 1 discloses the main components of the example embodiment. A copyright monitoring system 10 connects to a content system 12 on a user's computer 11 via the internet 13.

A copyright protected content system with access controls 14 is also connected to the user 11 by means of the internet 13 and a content delivery system 15. In the example embodiment the user 11 interacts with the copyright content management system 14 and the content delivery system 15 to get access to copyrighted content.

A learning management system (LMS) or virtual learning environment (VLE) 12 in communication with content management system 14 is accessed by a person on the persons computer 11 in respect of content derived externally for example from the copyright content management system 14. The copyright monitoring system 10 keeps track of the copyrighted material used by the user 11 and automatically warns the user 11 when different levels of usage are reached.

For example, for a small or limited use of copyrighted material, the user may be simply reminded to give a credit for the use of the copyrighted material without any need for payment. If the user starts to use a larger amount of copyrighted material and reaches the limits set by fair use law, then the copyright monitoring system notifies the user and then takes steps to help them ensure that they get adequate access or a license to the copyrighted material in order not to be in breach of copyright law.

Figure 2:
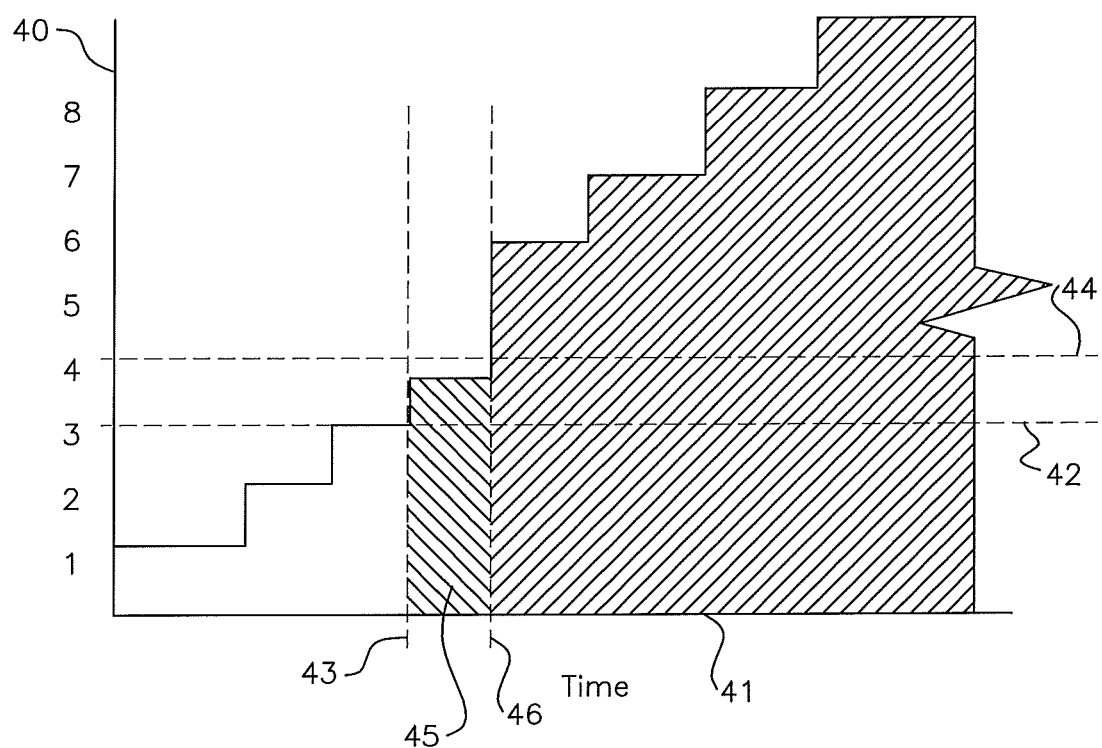

FIG. 2 discloses an example chart where fair use limits are set and triggered by a user's history of use of copyright material over time. A copyrighted book may contain eight chapters of information 40. As a user reads or accesses the book over time 41, the users reading activity is tracked and monitored. In this example, the rules for fair use for this particular situation allows the use of three chapters of the book 42 for unpaid perusal and evaluation.

Under the fair use conditions, reading any more than three chapters of the book 42, requires the book to be paid for. The fair use monitoring system may start to warn the user that they will have to pay for the book and provide means for the user to do so as they continue to read the book 45. Once the user exceeds the limit of fair use 44 the system may cut the user off from access to the copyrighted material if they have not paid for the book after reading four chapters 46.

The system would allow the user to read the equivalent of three chapters anywhere within in the book, but keep track of the read quantity so that the publishers rights to being reimbursed for the copyrighted material is not abused. At the same time the system allows the user to fully evaluate the book before purchase.

Figure 3:
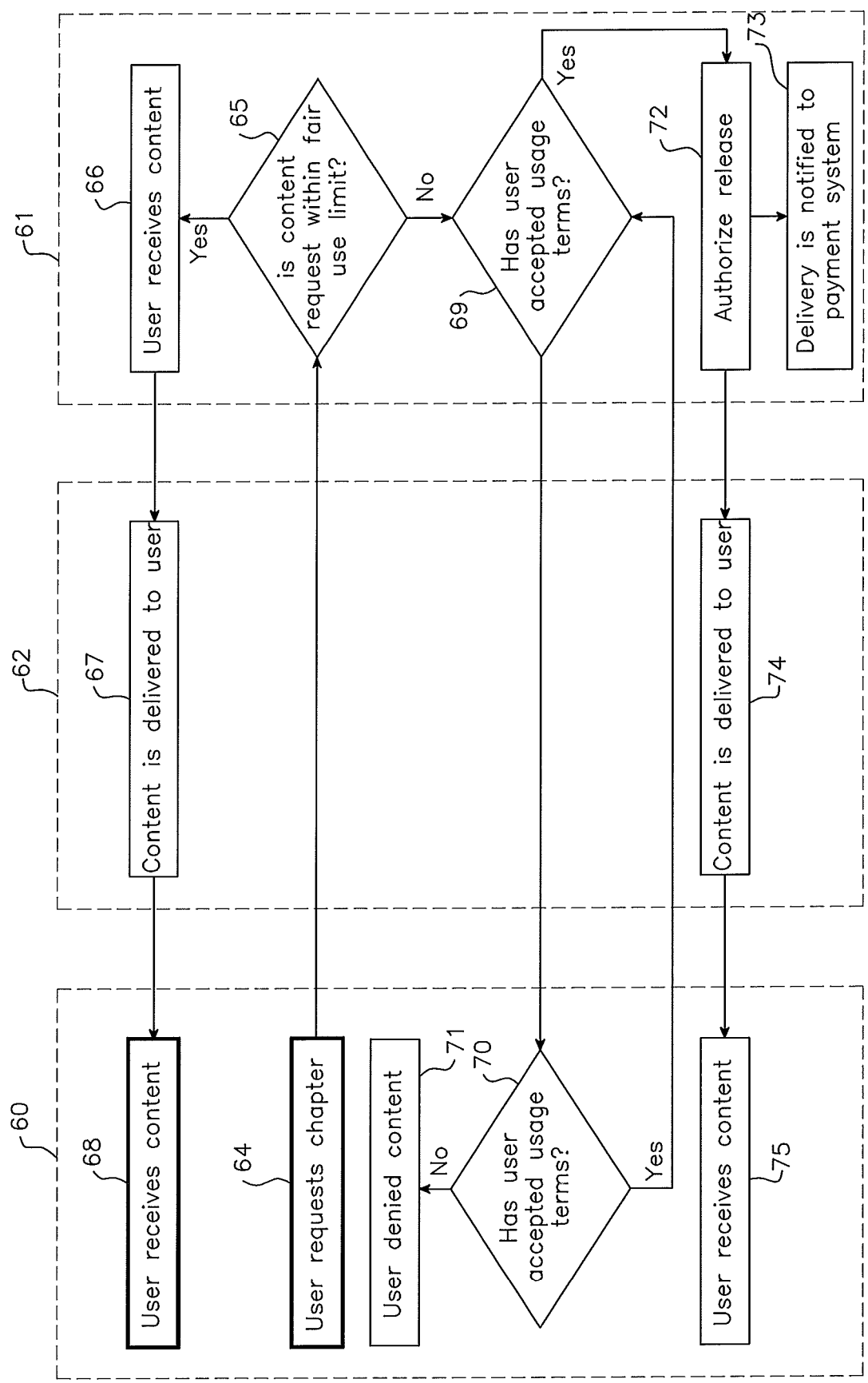

FIG. 3 shows the control process for the example embodiment. Initially, the user 60 interacts with a content monitoring system 61 that then directs the copyright content delivery system 62 to allow, or not allow, access to content. Initially, the user may request a chapter The content monitoring system checks to see if the users request is within fair use limits If it is, then the content monitoring system authorises the release 66 and the content is delivered to the user 67 and the user receives the content 68.

If the content request is not within fair use limits, the system asks whether the user has accepted the usage terms 69, if not then the user is given the opportunity to accept the terms

70. If they do not accept the terms, the user is denied access to the content 71. If the user accepts the term, then the system recognises that the terms have been accepted 69 and authorises the release of the content 72. When the release of content is authorised 72 two things happen. The delivery is notified to the payment system 73 for charging to the organisation or the individual and the content is delivered to the user 74 and the user receives the content 75.

Engine

Figure 4:
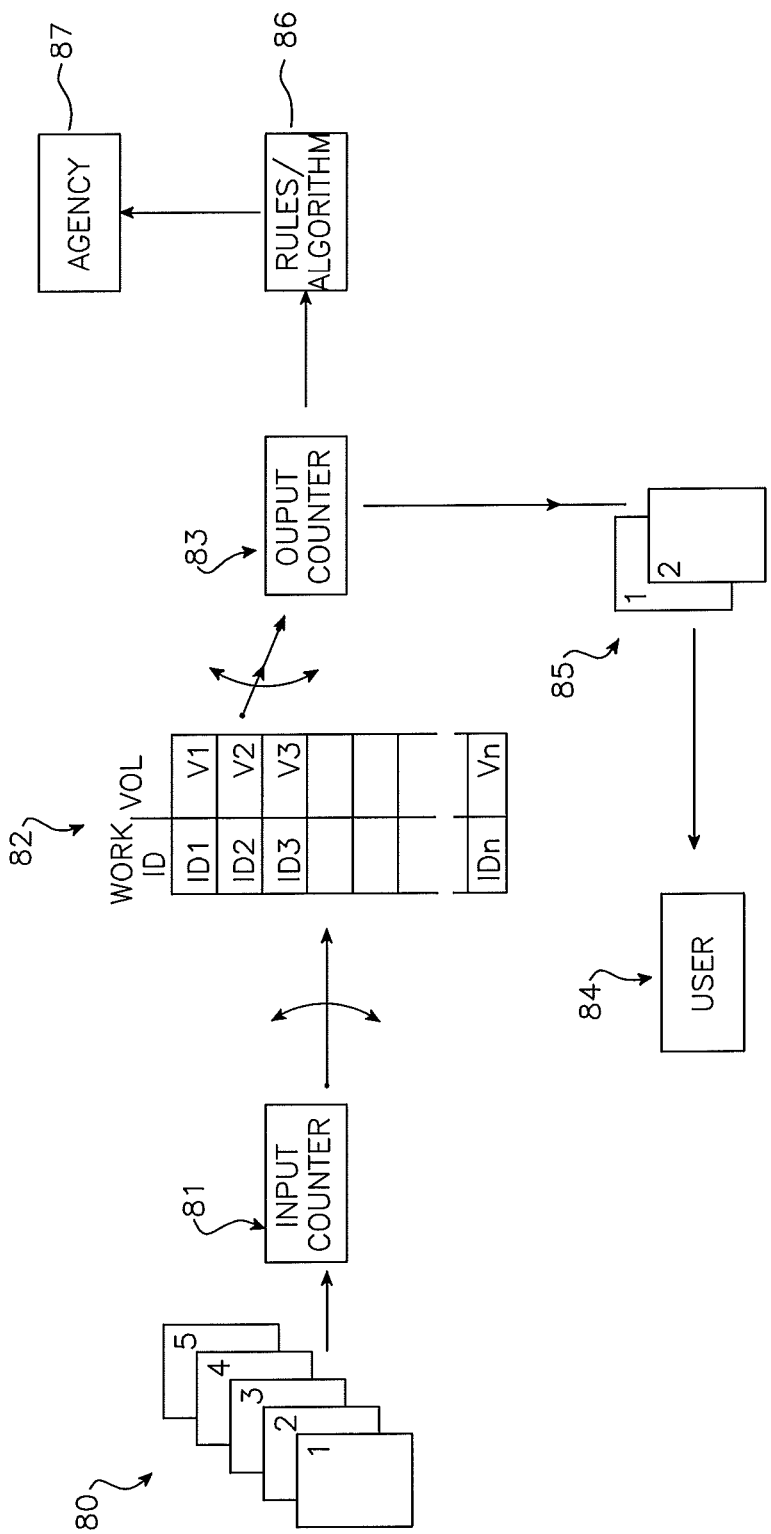
FIG. 4 is a block diagram of key functional components to implement the system of FIG. 1 or figure to FIG. 3

FIG. 4 illustrates a use scenario wherein key components of the system are utilised to quantify the extent of Copyright material available and extent of Copyright material used.

In this instance a work 80 comprises five written sheets of paper. The sheets are counted by counter 81 and the counter value for the work 80 is stored in database table 82 has counter or volume D 1 in respect of the work identified as ID 1.

The counter 81 is utilised to count multiple works and store them in the database table 82 as illustrated.

When it is desired to make use of a work or a portion of work is selected and that portion of work which is to be used is passed through output counter or meter 83, in this instance comprising work portion 85 in this instance specifically comprising two pages of the initial work ID 1 made available to user 84.

In preferred embodiments the output counter 83 is in communication with a copyright rules database 86 and also in communication with a Copyright agency 87 in order to provide reporting and cataloguing functions direct to the agency 87.

Further Embodiment

Figure 5:
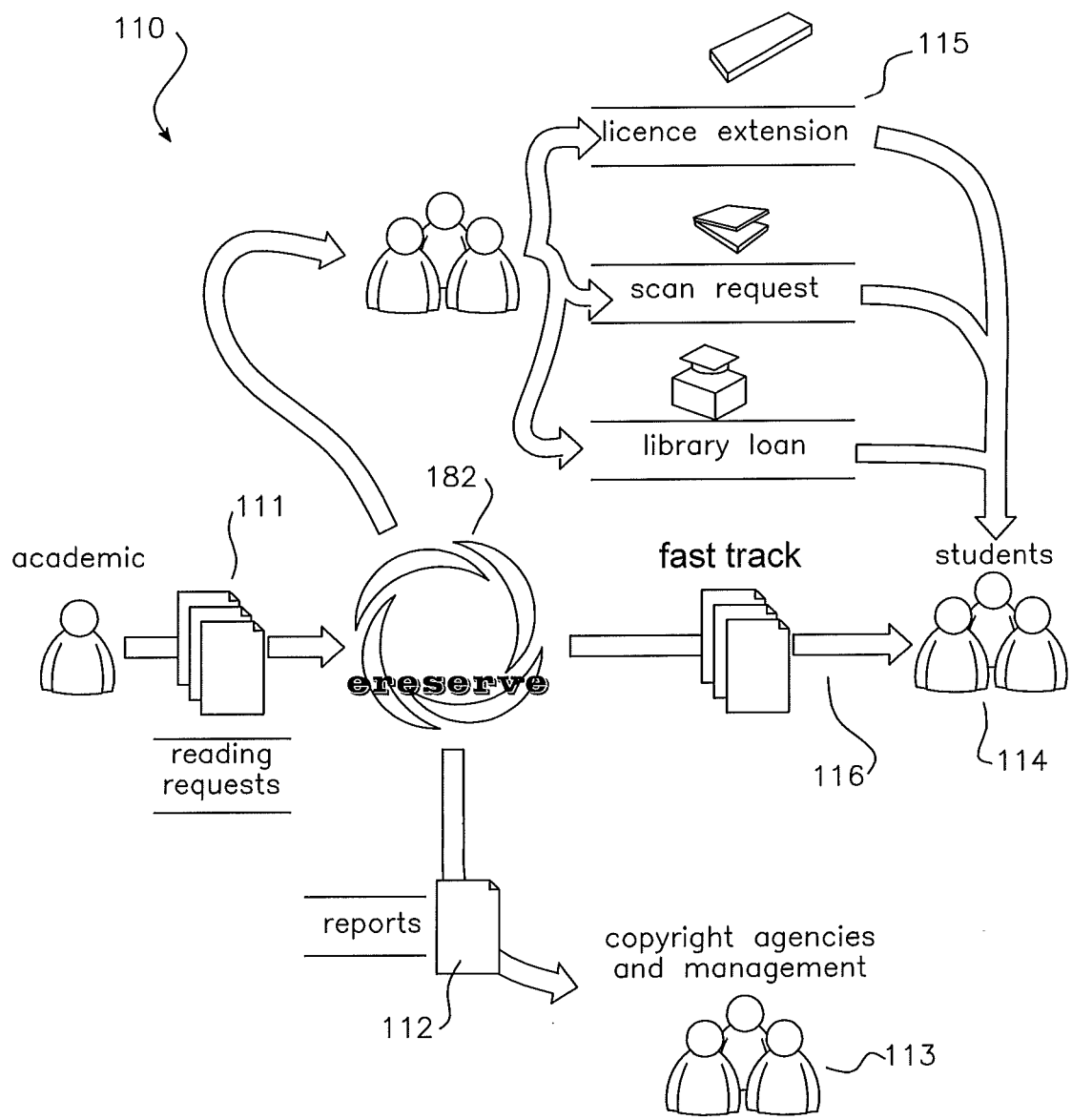
FIG. 5 is a block diagram of the components of a monitoring system according to a further embodiment.
Figure 6:
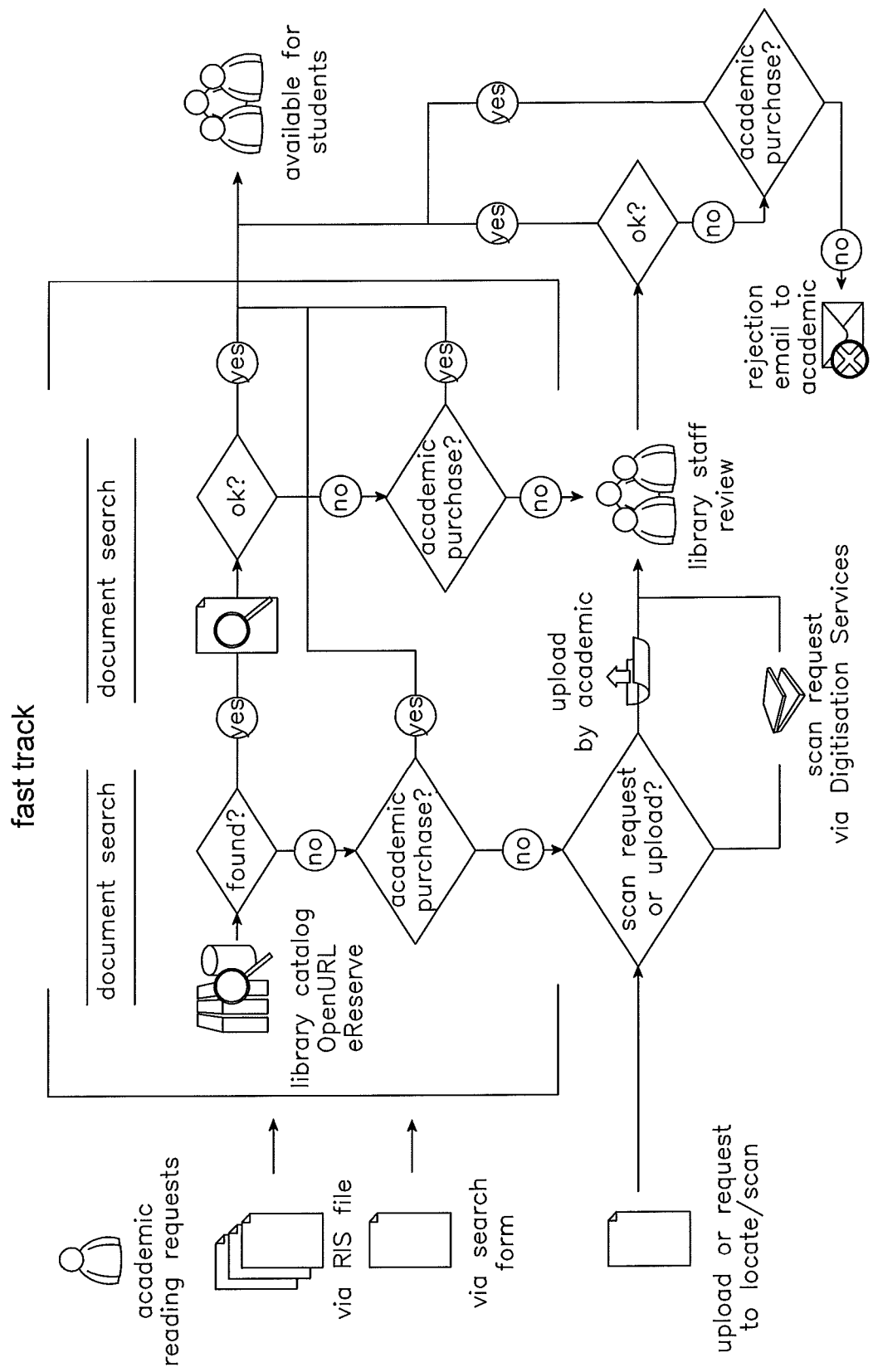
FIG. 6 is a flow chart of an implementation of the system of FIG. 4
Figure 7:
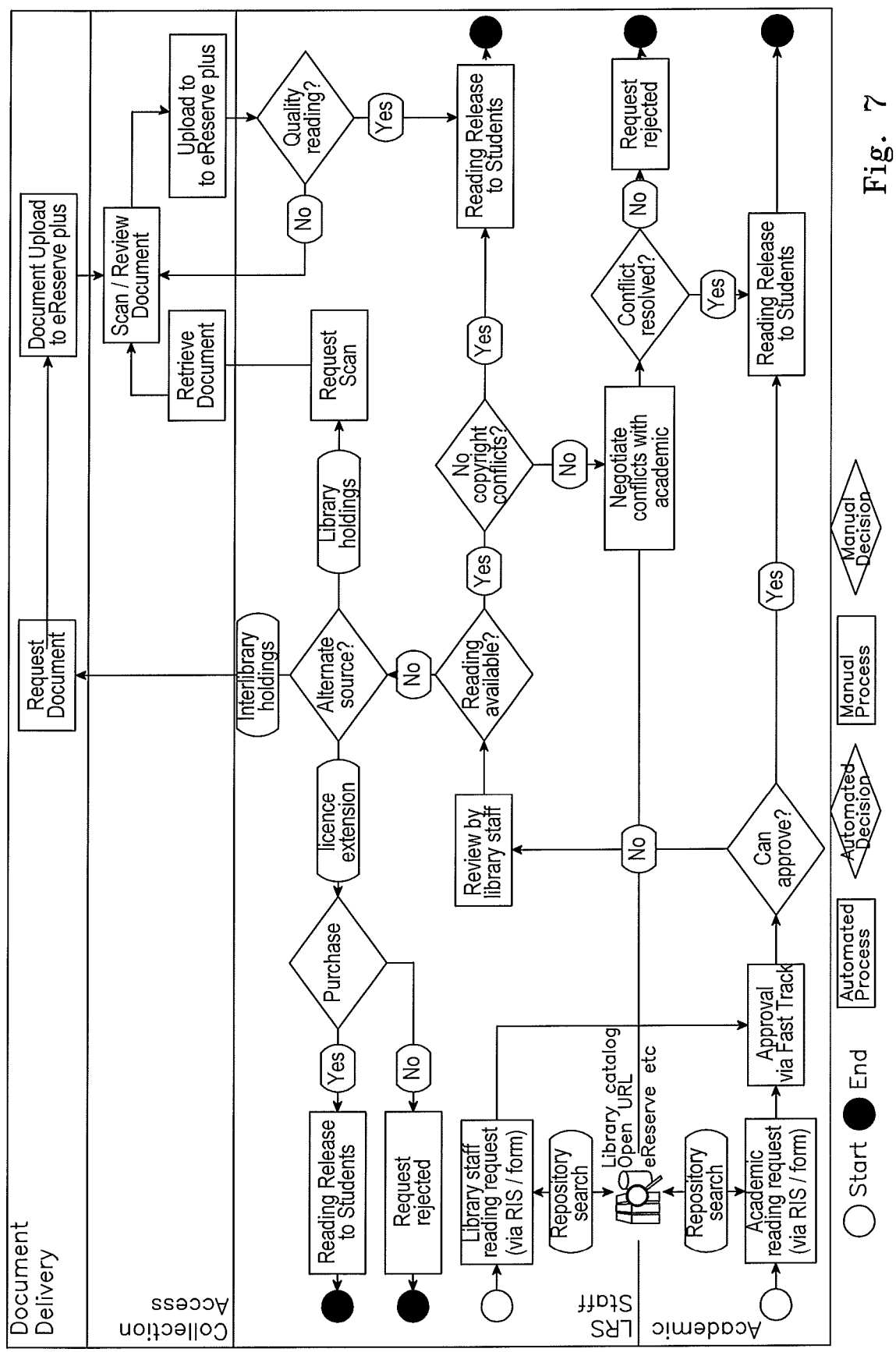
FIG. 7 is a detailed block diagram and flow chart of the system of FIG. 5.

With reference to FIGS. 5, 6 and 7 there are illustrated instances of a further system operable to effect the monitoring function described with respect to the initial embodiment.

Initially, with particular reference to FIG. 5, the system 110 broadly provides automated linkage of a reading request 111 for a portion of a Copyright work to a reporting function 112 which may then report, tabulate and quantify usage of the work to agencies and management 113. The work or a portion of his made available to users such as students 114 via one or more mechanisms such as loan, interlibrary loan, scan request. In particular forms, as previously described, rules may require payment of additional license fees 115 where portions of a work to be distributed and used exceed a predetermined minimum.

In a particular form the database system 182 may automatically release specified portions of the work via automated route 116 if the work requested or portions thereof fall within predetermined limits.

With reference to FIG. 6 a flow chart illustrating additional detail as compared with the arrangement of FIG. 5 is illustrated. A request for a work may be made in one of many forms and is then referenced against a database such as a library catalogue and, if located and correlated, then proceeds through permission checking in order to be made available for consumption and that consumption reported and quantified.

With reference to FIG. 7, in an additionally detailed flowchart of the arrangement of FIGS. 5 and 6 is illustrated in block form.

Alternative Embodiments

The example embodiment uses an example publication where the fair-use limit is set to three chapters of an eight chapter book. An alternative embodiment can use any limits set by fair use laws or similar principles of any individual jurisdiction and can be utilised of content with content of any length or number of chapters.

The example embodiment is designed for use with fiction and nonfiction books including, but not limited to, technical books and academic works. Alternative embodiments could be used with any copyrighted material including but not limited to audio works, music, movies and portfolios of images.

The example embodiment uses rules that are specifically geared towards the use of books. An alternative embodiment could use any combination of content media and rules that may be different for each media type or different volumes of copyrighted material being used.

The example embodiment is very simple in its design for the sake of explanation. An alternative embodiment could involve very complex usage monitoring and usage criteria rules involving complex license agreements. For example, an organisation may have a subscription access to a wide range of content, whereas some components of the content may require individual work by work payment terms.

The monitoring system could be designed to cater for any combination of copyright access from subscription through to individual purchase and timed access or rental rules. An example could be a Library situation where the books are loaned and are used for a specific period of time, or where a limited number of books are to be used by an organisation and a user must use a queuing system to get access to that content.

The invention claimed is:

1. A system for monitoring copyrighted material, said system comprising:
   a library of material in which Copyright or related rights subsist;
   a lookup table linking Copyright data to each item of material;
   a database of Copyright use rules for use of copyrighted material;
   a mechanism for quantifying the copyrighted material in each item of material;
   a mechanism for metering use of the copyright material in each item of material based on quantity of material accessed in each instance of use of the item of material;
   a mechanism for permitting access to the item of material as a function of the Copyright use rules;
   the system incorporating a fast track methodology wherein on a request made by a user for copyright material, an initial check is made of the contents of the database to determine if the copyright material has already been processed by the system in which event the copyright material is made available to the user; in the event the copyright material has not been processed by the system, then a check is made to see if the copyright material is the subject of authorized purchase for use in which event the copyright material is made available to the user; in the event that that copyright material has neither been processed by the system nor is the copyright material the subject of authorized purchase for use then copyright material is submitted to the system in order to thereby make the copyright material available to the user.

2. The system of claim 1 wherein in the event fair use is unavailable or exhausted for the item of material a user may purchase a license for use of the copyrighted material thereby permitting access to the item of material.

3. The system of claim 2 further including a fair use monitoring system wherein fair use limits are set and triggered by a user's history of use of copyright material over time.

4. The system of claim 3 wherein the monitoring system warns the user prior to reaching the fair use limit that has been set.

5. The system of claim 4 wherein the user is cut off from access if they reach the fair use limit and have not availed themselves of the means to continue access to the copyright material.

6. An engine for monitoring proportion of a document to which access is given; the engine including:
- a processor and memory programmed with a program so as to act as an input counter which provides a count value which quantifies the extent of text, graphics and content in the document in its entirety;
- a database for storing count value for each document referenced against each document;
- an output counter which provides a count value which quantifies the extent of the document released to a user;
- the engine incorporating a fast track methodology wherein on a request made by a user for copyright material, an initial check is made of the contents of the database to determine if the copyright material has already been processed by the system in which event the copyright material is made available to the user; in the event the copyright material has not been processed by the engine, then a check is made to see if the copyright material is the subject of authorized purchase for use in which event the copyright material is made available to the user; in the event that that copyright material has neither been processed by the engine nor is the copyright material the subject of authorized purchase for use then copyright material is submitted to the engine in order to thereby make the copyright material available to the user.

7. The engine of claim 6 wherein the input counter is in the form of a document scanner.

8. The engine of claim 6 wherein the output counter is in the form of a document scanner.

9. The engine of claim 6 wherein the input counter is in the form of a document ID recognition system.

10. The engine of claim 6 wherein the output counter is in the form of a document ID recognition system.

11. The engine of claim 6 wherein the input counter is in the form of a document ID recognition system which recognizes and reads document ID at a granular level.

12. The engine of claim 6 wherein the output counter is in the form of a document ID recognition system which recognizes and reads document ID at a granular level.

13. The engine of claim 6 wherein granular level is a page of a work.

14. The engine of claim 6 wherein granular level is a page of a work identified by a DOI.

15. The engine of claim 6 wherein a work is identified by its allocated ISBN number identifier.

16. A method for monitoring copyrighted material, said method comprising the following steps:
- assessing the entirety of content of a work so as to define an entire work quantity
- assessing and quantifying that portion of a work which is accessed so as to define an accessed quantity;
- comparing the accessed quantity and the entire work quantity algorithmically with reference to a rules database so as to define a proportion component;
- determining if the proportion component is above a predetermined value;
- the method incorporating a fast track methodology wherein on a request made by a user for copyright material, an initial check is made of the contents of the database to determine if the copyright material has already been processed by the system in which event the copyright material is made available to the user; in the event the copyright material has not been processed by the method, then a check is made to see if the copyright material is the subject of authorized purchase for use in which event the copyright material is made available to the user; in the event that that copyright material has neither been processed by the method nor is the copyright material the subject of authorized purchase for use then copyright material is submitted to the method in order to thereby make the copyright material available to the user.

17. The method of claim 16 wherein if the proportion component is above a predetermined value then a reporting process is instigated.

18. The method of claim 17 wherein the reporting process involves communication of data in packet form over the Internet.

* * * * *